Nov. 30, 1943. W. F. M. EDWARDS 2,335,747
MANUFACTURE OF CIGARETTES
Filed July 9, 1940 9 Sheets-Sheet 1

INVENTOR
W. F. M. EDWARDS
By
Young, Emery & Thompson
ATTYS.

Nov. 30, 1943.     W. F. M. EDWARDS     2,335,747
MANUFACTURE OF CIGARETTES
Filed July 9, 1940     9 Sheets-Sheet 3
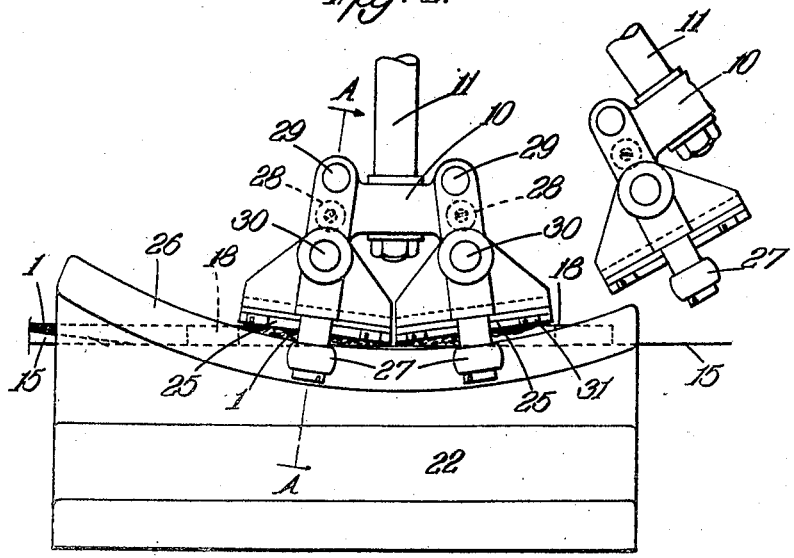
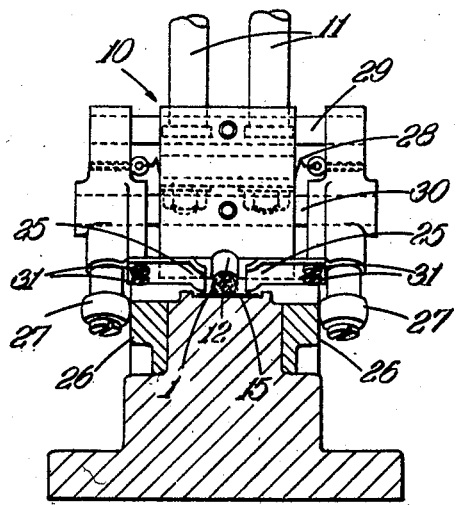
INVENTOR
W. F. M. EDWARDS
By
Young, Emery & Thompson
ATTYS.

Nov. 30, 1943.    W. F. M. EDWARDS    2,335,747
MANUFACTURE OF CIGARETTES
Filed July 9, 1940    9 Sheets-Sheet 4
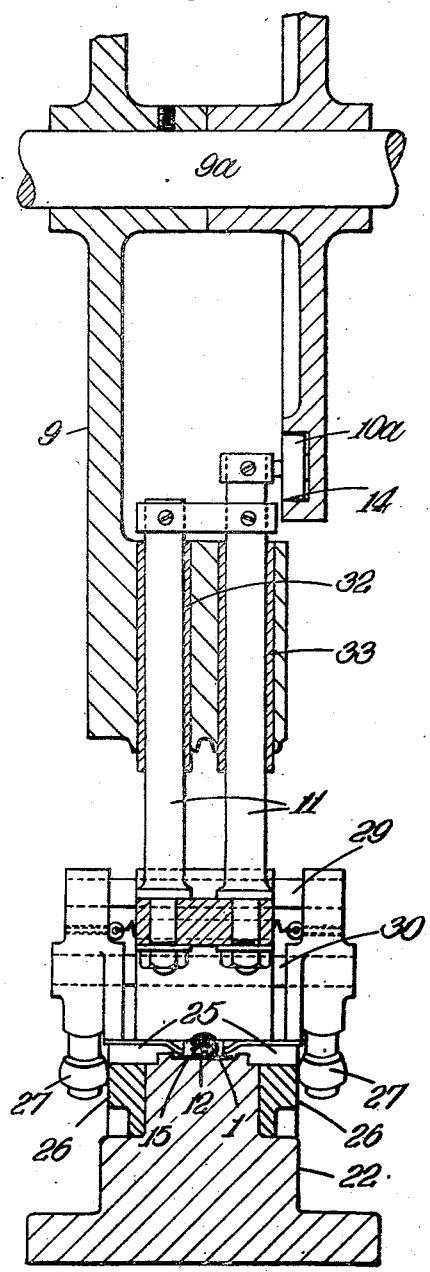
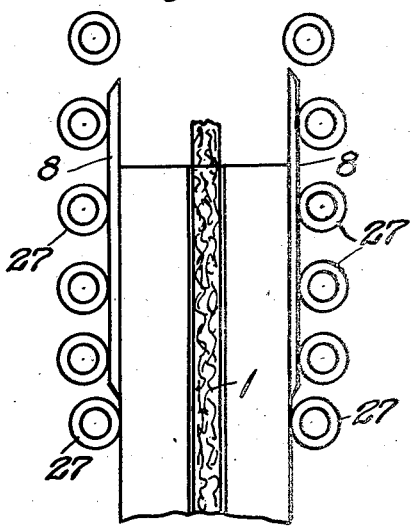
INVENTOR
W. F. M. EDWARDS
By
Young, Emery & Thompson
ATTYS.

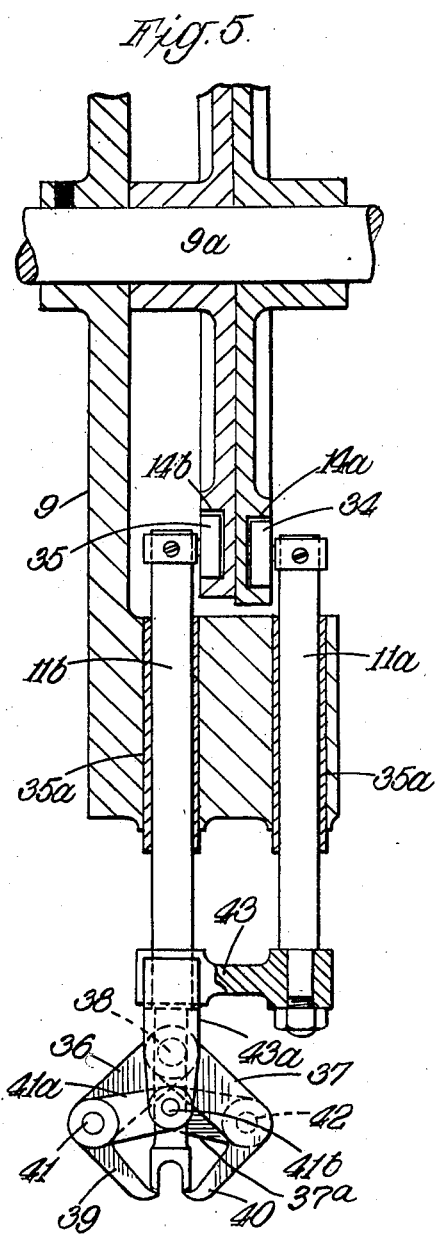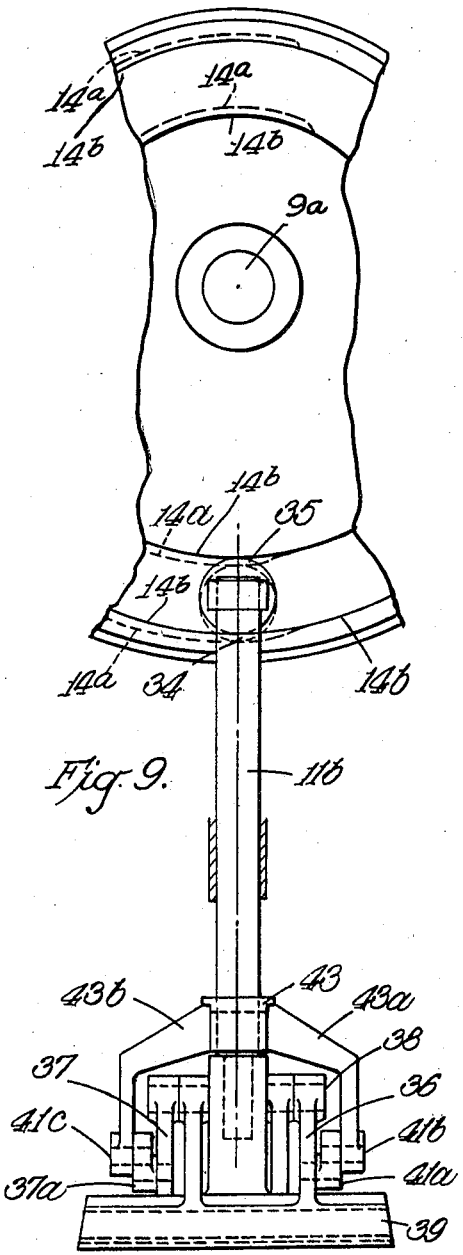

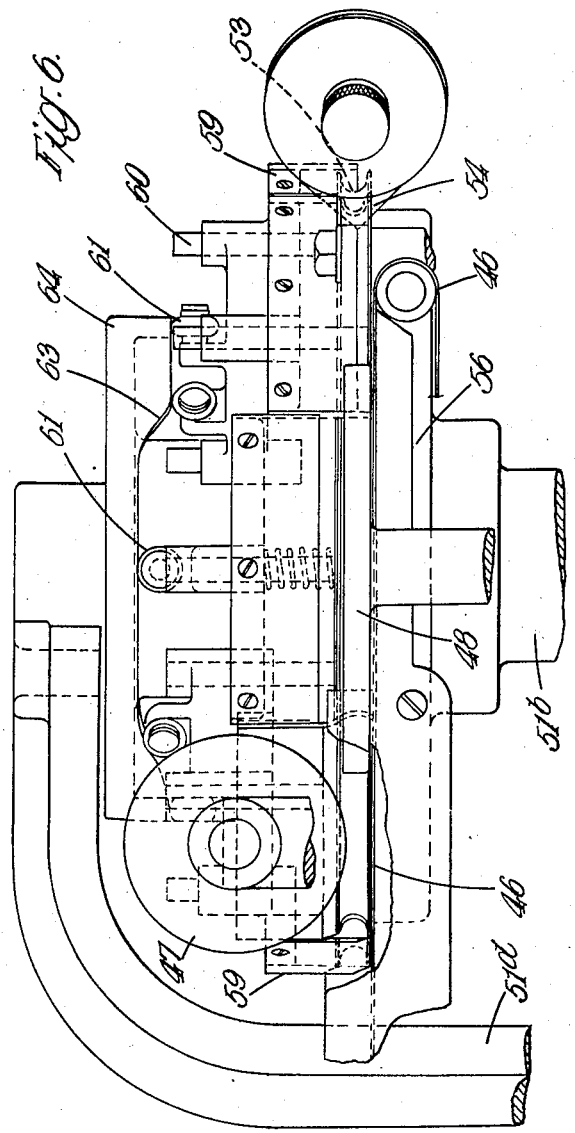

Nov. 30, 1943.  W. F. M. EDWARDS  2,335,747
MANUFACTURE OF CIGARETTES
Filed July 9, 1940  9 Sheets-Sheet 7
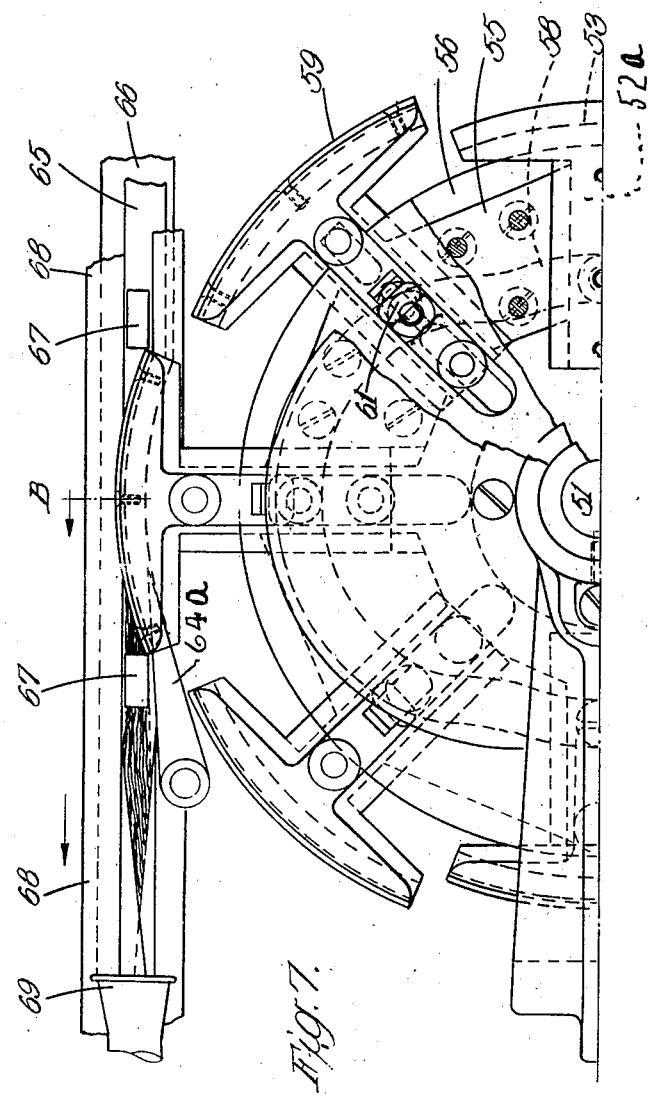
INVENTOR
W. F. M. EDWARDS
BY
ATTYS.

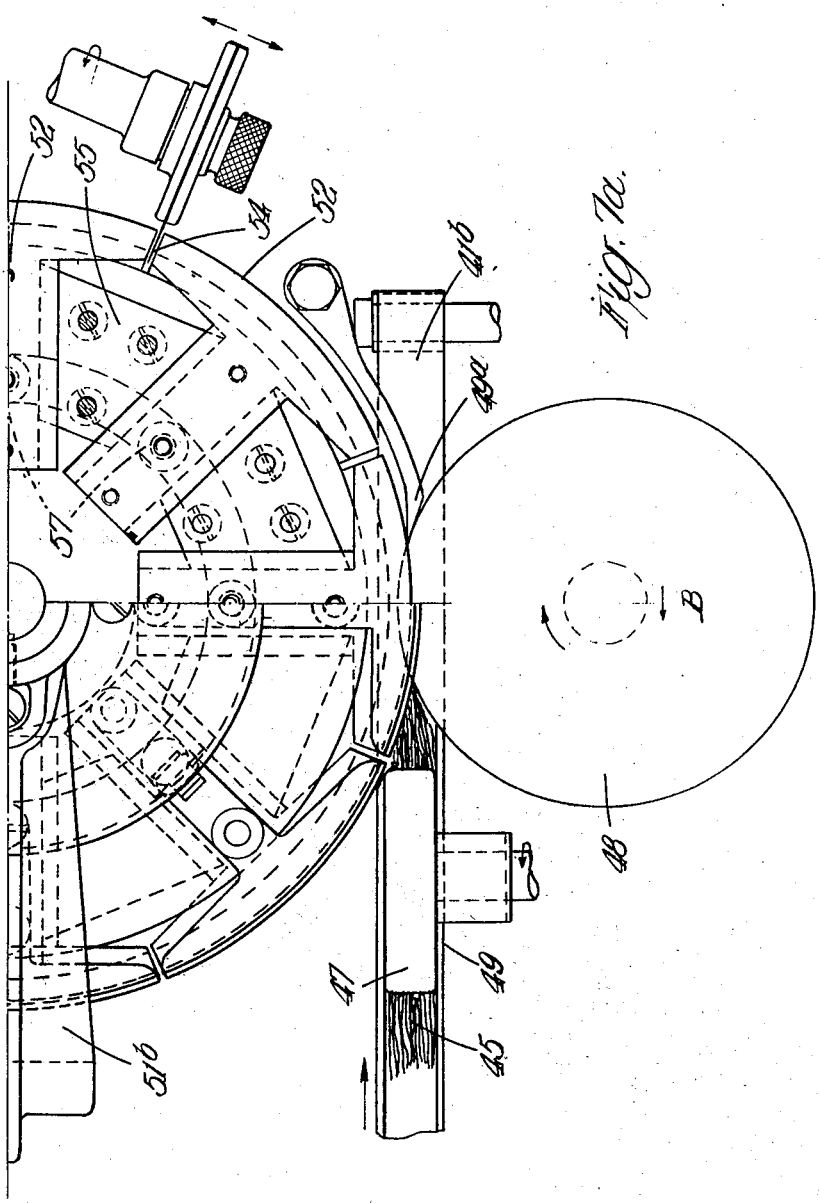

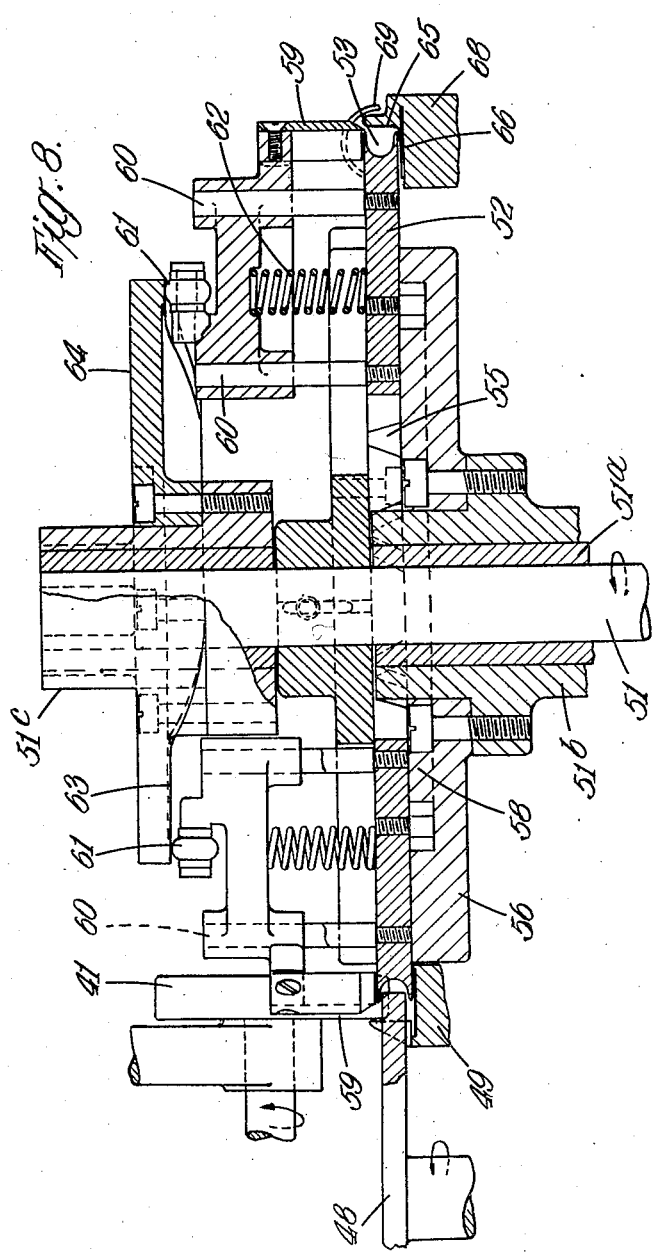

Patented Nov. 30, 1943

2,335,747

UNITED STATES PATENT OFFICE 2,335,747

MANUFACTURE OF CIGARETTES

William Frederick Maitland Edwards, Esher, England, assignor to Filter Tips Limited, London, England Application July 9, 1940, Serial No. 344,581
In Great Britain August 10, 1939

17 Claims. (Cl. 131—61)

This invention relates to cigarettes and is particularly concerned with improvements in the manufacture of filter tip cigarettes utilising a machine of the continuous rod type.

According to this invention a method is provided for the production of filter tip cigarettes by the formation of spaces for the reception of filter tips in a continuous tobacco filling, in which a continuous length of tobacco is fed onto a rotating circular member, the length is severed into portions and the severed portions are moved radially outwards to form spaces between them.

The invention further includes a machine for manufacturing filter tip cigarettes which comprises a rotatable circular member, means such as a hopper for supplying a continuous length of tobacco thereto, means for severing the length of tobacco into portions and means for moving the severed portions radially outwards to form spaces between them.

The tobacco may be severed by the radial outward movement, but it is preferred to employ cutting means such as one or more knives for this purpose. The tobacco may be severed into portions corresponding in length to the tobacco portion of a filter tip cigarette and the space between adjacent severed portions may be arranged to receive a single length of filter tip material. Preferably, however, the severed portions will correspond in length to the combined tobacco portions of two filter tip cigarettes and the space between adjacent portions will be arranged to receive a double length of filter tip material.

The lengths of filter tip material may be arranged by any desired means in the spaces formed between adjacent severed tobacco portions. Preferably the severed portions are transferred from the rotatable circular member to a moving web of paper, and lengths of filter tip material are placed upon the web at spaced intervals before, at the same time as, or after the tobacco portion is transferred to the web in such a way that the lengths of filter tip material lie in the required position.

If desired the lengths of filter tip material and the tobacco portions which are now in proximity to each other may be moved relatively to each other to effect abutment.

The web of paper is then folded around the tobacco portions and the lengths of filter tip material to form a continuous cigarette rod in the usual manner. Thereafter, also by known means, the rod is cut at appropriate places to form cigarettes of the desired length.

The rotatable circular member may be disposed horizontally, vertically or at an angle to the vertical.

According to one embodiment of the present invention a continuous length of tobacco is fed onto a horizontally disposed rotating circular member, the length is cut into portions of the combined length of the tobacco portions of two filter tip cigarettes which are then pushed towards the periphery of the circular member to form spaces between the severed tobacco portions which are then transferred from the rotating circular member to a moving web of paper upon which lengths of filter tip material are located at spaced intervals in such a way that each tobacco portion is disposed between two lengths of filter tip material and in close proximity thereto whereafter the web of paper is folded around the tobacco portions and the lengths of filter tip material to form a continuous cigarette rod in the usual manner. Thereafter, also by known means, the rod is cut so that the portions of tobacco and the lengths of filter tip material are bisected to form cigarettes of the desired length.

According to a modification of this embodiment of the invention the lengths of filter tip material may be deposited on the rotating circular member in spaces between the severed tobacco portions instead of providing lengths of filter tip material on the moving web of paper.

According to a further embodiment of the invention a continuous rod of tobacco supplied for example from a hopper is deposited upon the periphery of a vertically disposed rotating circular member preferably upon the upper side thereof. The cigarette rod is held, for example by clamping means, and/or by suction, upon the rotating member, preferably in a peripheral groove provided therein, and thereafter is severed into portions of substantially the combined length of the tobacco portions of two filter tip cigarettes for example by means of a reciprocating cutter knife, whereupon the severed portions are moved radially outwards until the distance between them is equal to, or slightly greater or slightly less than, the length of filter tip material later to be disposed therebetween. The portions of tobacco are then carried round upon the circular member to a point, preferably at the bottom of the circular member, at which the severed portion of tobacco is released and deposited upon a moving web of paper between the lengths of filter tip material located at spaced intervals upon the moving web, or as each severed portion of tobacco is deposited on the web a length of the filter tip material may be deposited on the web in proximity to the lengths of tobacco. The deposition of the length of filter tip material may be effected simultaneously with or immediately after the deposition of the tobacco portion. The moving web carrying the combined portions of tobacco and filter tip material then passes into the usual garniture machine.

If desired the length of tobacco may be subjected to the action of a compression wheel or wheels before, during or immediately after the tobacco is fed onto the circular member.

The periphery of the vertically disposed rotating circular member is preferably built up of a plurality of carrier members provided with a peripheral groove for receiving the length of tobacco. The carrier members may be mounted upon radius rods and are arranged to be moved radially inwards and outwards. In their innermost position there is only a small clearance between adjacent carrier members sufficient to afford passage to the cutting means.

Means are provided for moving the said carrier members radially inwards and outwards, which may advantageously comprise a cam and push rod device. Each carrier member is provided with releasable clamping means for holding the lengths of tobacco in the peripheral grooves. The clamping means may comprise two slidable jaws urged towards one another by spring action so as to hold the portion of tobacco clamped between them, and provided with cam rollers by means of which they may again be separated. Arcuate cam rails or tracks co-operating with the said cam rollers are arranged concentric with the circular rotatable member adjacent the point where the tobacco is to be deposited upon the circular rotatable member and the point where the severed lengths of tobacco are to be removed therefrom.

As a carrier member approaches its highest point of travel, where the tobacco is to be deposited upon it, the corresponding cam rollers ride up upon their cam rails or tracks and separate the slidable jaws to permit the deposit of the length of tobacco upon the carrier member. On passing this point the cam rollers again leave their cam rails or tracks allowing the slidable jaws to move towards one another under spring action and clamp the tobacco between them. Similarly as the carrier member approaches its lowermost point of travel where the severed portion of tobacco is to be removed, the corresponding cam rollers again ride up upon their cam rails or tracks and separate the two slidable jaws and allow the portion of tobacco to be transferred from the carrier member on to the moving web of paper.

An alternative form of clamping means comprises two curved arms pivoted upon each carrier member and arranged to embrace the length of tobacco positioned in the peripheral groove in the said carrier member. The arms are caused to swing towards and away from one another, so as to clamp and release the length of tobacco, by means of a cam and push rod mechanism acting upon the clamping arms through a toggle device. The timing of this clamping device is such that the arms open immediately prior to receiving the length of tobacco and thereafter close and again open when the severed length of tobacco is to be deposited upon the moving web.

The lengths of filter tip material may be deposited on the moving web of paper in any desired manner for example as described in British Patent No. 389,499.

If desired tipping material such as cork may be applied to the cigarettes in the usual manner.

Two embodiments of the invention will now be described by way of example with reference to the accompanying drawings in which:

Fig. 2 is a view on an enlarged scale of one form of the release mechanism;

Fig. 3 is a view partly in section on the line A—A of Fig. 2;

Fig. 4 is a sectional view showing on an enlarged scale the movement of the radius rods;

Fig. 5 is a sectional view of a modified form of release mechanism;

Fig. 6 is a side view of another machine according to the invention;

Figure 1:
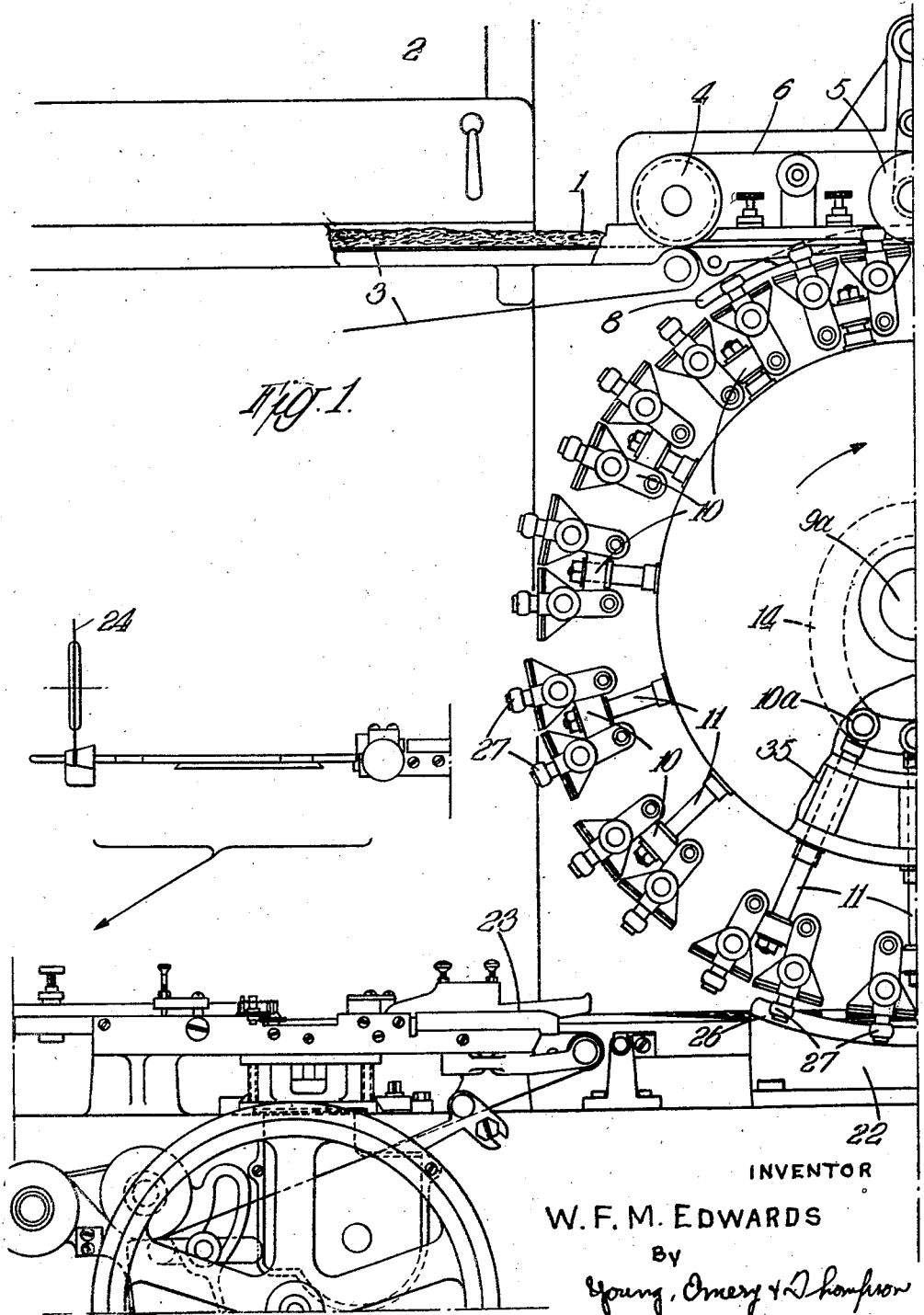
Figs. 1 and 1a are side views of the machine according to the invention partly in section.
Figure 1A:
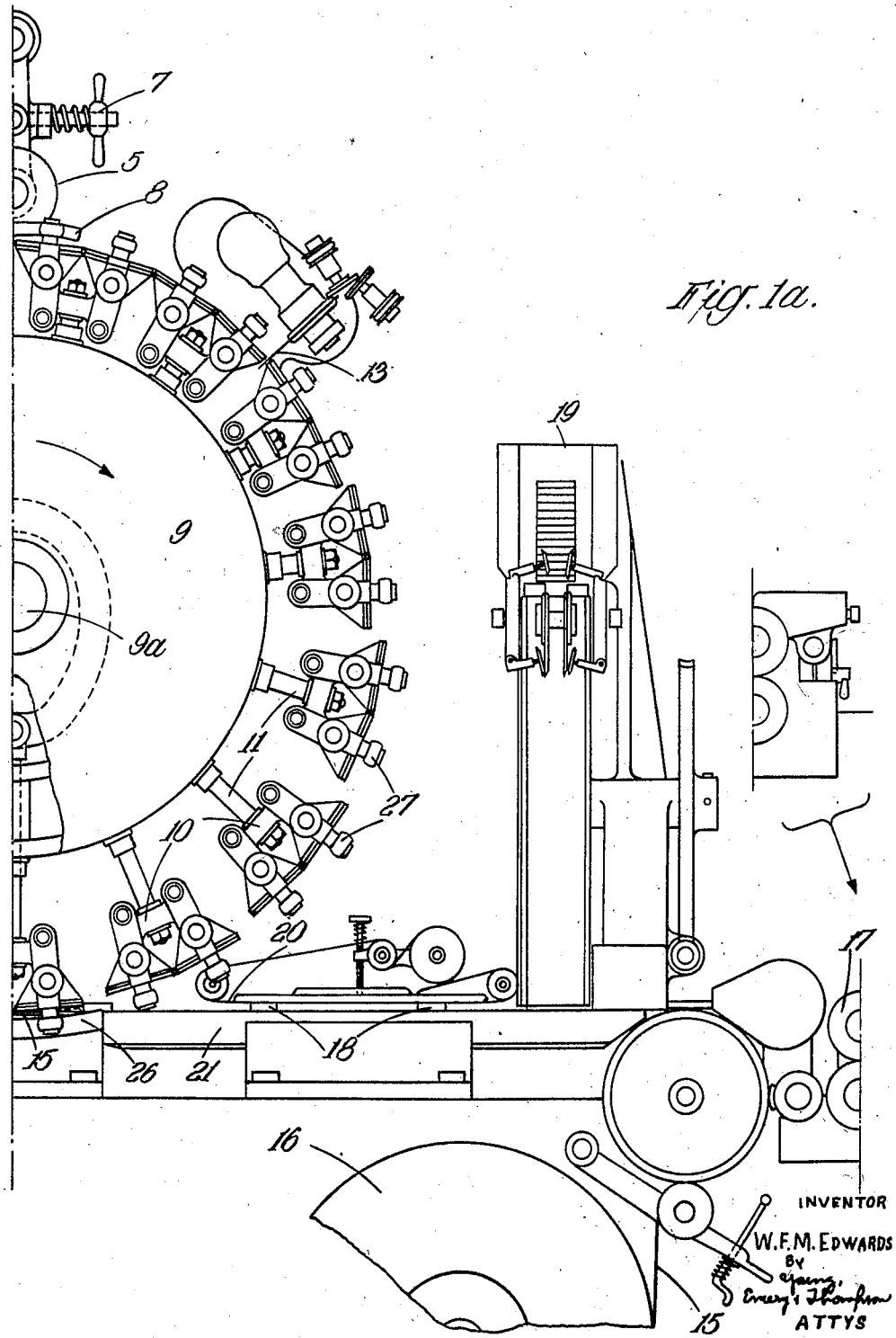

Figs. 7 and 7a taken together show a top plan view with portions removed of the machine shown in Fig. 6;

Fig. 8 is a section on the line B—B of Fig. 7;

Fig. 9 is a side view partly in section of the modified form of release mechanism shown in Fig. 5; and—

Fig. 10 is an enlarged plan view showing the upper cam tracks for operating the carrier rollers of Figs. 1-4.

Referring now to Figs. 1 to 5 of the drawings:

A continuous rod of tobacco 1 is supplied from a hopper 2 to a conveyor belt 3 which passes it under compression wheels 4 and 5 and compression band 6, the compression being varied as desired by the tension spring 7. The tobacco rod is then guided between the cam tracks 8 on to the periphery of a circular member 9 mounted on the shaft 9a and made up of a number of carrier members 10 each being movable radially on a pair of radius rods 11 and being provided with a channel 12 in which the tobacco rests, and in which it is gripped by plates 25 which are described in detail hereinafter and which are held open by the cam tracks 8. The tobacco is then severed by a reciprocating cutter knife 13 of conventional design which operates in the space between adjacent carrier members into portions of substantially the combined length of the tobacco portions of two filter tip cigarettes. The carrier members after they have passed the knife 13 are gradually moved radially outwards to form spaces between the tobacco portions by the action of a fixed cam track 14, acting on rollers 10a. On reaching the lowermost point of travel of the rotating circular member 9 each severed portion of tobacco is released in turn by the means hereinafter described and is deposited upon a moving web of paper 15 fed from a bobbin 16 in the usual manner. The paper is gummed at spaced intervals by a gumming unit 17 of the usual kind and wads 18 of twice the length required for a filter tip cigarette are deposited on the gummed portions of the paper from the wad hopper 19 also of the usual kind leaving a space between each wad of substantially the combined length of the tobacco portions of two filter tip cigarettes. The guide tape 20 serves to hold and align the wads on the paper and the heated platform 21 dries the gum and fixes the wads to the paper. The timing is such that the released portions of tobacco which are guided by the ramp 22 are deposited between the wads and the whole assembly then passes through a garniture 23 of the usual kind and the continuous rod thus formed is divided into individual cigarettes by the knife 24 in the usual manner. After releasing the tobacco the carrier members 10 move inwards under the action of the rollers 10a on the radius rods 11 following the contour of the fixed cam track 14 until they again reach the knife 13.

The action of two forms of the releasing device will now be described in greater detail with particular reference to Figs. 2, 3, 4 and 5. Referring first to Figs. 2 and 3, the tobacco 1 has just been released on to the paper 15 from between the retractable tobacco gripper plates 25 which have been drawn apart by the motion of the gripper carrier rollers 27 in passing over the arcuate cam tracks 26. Before the cam tracks 26 act the gripper plates 25 grip the tobacco by the action of the tension spring 28 moving along the guide rods 29 and 30. The gripper plates may be adjusted by means of the screws 31.

Referring now to Fig. 4, the pair of radius rods 11 are provided with a roller 10a which follows the contour of the fixed cam track 14, which is mounted co-axially with the shaft 9a. The radius rods 11 rotate on the shaft 9a and move outwards and inwards in bearings 32 and 33 in accordance with the outline of the fixed cam (see Fig. 1).

A modified form of release device is shown in Figs. 5 and 9 of the drawings in which the release is effected positively by a toggle action. Referring to Figs. 5 and 9 of the drawings the two radius rods 11a and 11b are provided with rollers 34 and 35 which operate in the fixed cam tracks 14a and 14b respectively. The cams 14a and 14b are mounted co-axially with the shaft 9a. The radius rods 11a and 11b rotate with the shaft 9a and move outwards and inwards in the bearings 35a. At the lower end of the radius rod 11b two toggle levers 36 and 37 are pivoted on the pivot 38. When the radius rods 11a and 11b have reached the lowermost position brought about by movement of the roller 35 against the fixed cam 14b the jaws 39 and 40 pivoted at 41 and 42 respectively are still closed but the radius rod 11a now descends further under the influence of the cam 14a and the arms 43a and 43b of link 43 depress the pivot points 41b and 41c imparting to the toggles 41a and 37a an obtuse action, and thereby causing the jaws 39 and 40 to open and release the tobacco portion.

From the foregoing description it will be appreciated that when one of the clamping units is at the upper portion of the wheel, the cam tracks 14a and 14b will be in such a position that the rod 11b will be retracted and the rod 11a will likewise be retracted but to a lesser degree than rod 11b so that the jaws 39 and 40 will remain separated. As this particular pair of jaws moves with the wheel downwardly the cam track 14a is displaced slightly inwardly so that it lies coextensively with cam track 14b. This causes the jaws 39 and 40 to move toward each other to grip the portion of tobacco so that it will be held during the remaining travel of the jaws until the latter reach the lowermost position. During the travel of the clamping jaws of a particular unit from the uppermost to lowermost position of the wheel, said jaws are maintained in clamping position but are gradually moved radially outwardly with respect to the wheel due to the contour of the coextensive cam tracks 14a and 14b. At the lower portion of the cams the track 14a again departs from track 14b as shown in Fig. 9 of the drawings so that in addition to the rods 11a and 11b being fully extended as shown in Fig. 5 of the drawings, the rod 11a is moved through a slightly greater distance to cause the clamping jaws 39 and 40 to separate to permit deposition of the tobacco portion previously clamped thereby.

The timing of this clamping device is such that the arms open immediately prior to receiving the length of tobacco and thereafter close and open again when the severed length of tobacco is to be deposited upon the moving web of paper.

Referring now to Figs. 6 to 8 of the drawings:

A continuous rod of tobacco 45 is supplied from a hopper of the kind shown in Fig. 1 to a conveyor belt 46 which passes it under compression wheels 47 and 48 and then the stripper 49a feeds the tobacco on to the periphery of a horizontally disposed circular member mounted on the shaft 51 which runs in bearings 51a carried in housings 51b and 51c, the whole being suspended from a bracket 51d. The circular member comprises a number of carrier members 52 movable radially by the means hereinafter described. Each of the carrier members 52 is provided with an inwardly directed radial projection 52a and a peripheral channel 53 for the reception of the tobacco in which it is releasably held by the means hereinafter described. The tobacco is severed by a reciprocating cutter knife 54 of conventional design which operates in the space between adjacent carrier members into portions of substantially the combined length of the tobacco portions of two filter tip cigarettes. The carrier members 52 after they have passed the knife 54 are gradually moved outwards between the guide blocks 55 by the action of the fixed cam 56 and the cam rollers 57 moving in the cam track 58. The tobacco is retained in the peripheral channel 53 by means of a closure member 59 which is movable on guide rods 60 and is actuated by a carrier roller 61 which urged by a compression spring 62 passes over an arcuate cam track 63 of a fixed cam 64.

When a carrier member 52 has moved radially outwards as far as is allowed by the configuration of the cam track 58 the configuration of the arcuate cam track 63 is such that the closure member 59 is fully open and the tobacco is transferred from the peripheral channel 53 by a stripper 64a and is deposited upon a moving web of paper 65 carried on a carrier band 66. The web of paper has disposed upon it wads 67 of twice the length required for a filter tip cigarette, the space between each wad being substantially the combined length of the tobacco portions of two filter tip cigarettes. The guide tape 68 serves to hold and align the wads on the paper. The wads may be deposited on the paper in any convenient manner, for example as hereinbefore described in connection with Figs. 1 to 5 of the drawings.

The timing is such that the released portions of tobacco stripped off by the stripper 64 are deposited between the wads and the whole assembly then passes through a garniture 69 of the usual kind and the continuous rod thus formed is divided into individual cigarettes by a knife such as shown in Fig. 1 in the usual manner.

After releasing the tobacco the carrier members 52 move inwards following the configuration of the cam track 58.

The term "rotatable circular member" as used herein is to be understood as including a rotatable polygonal member.

The expression "filter tip material" as used herein comprises filter tips, wads or plugs of any desired material or combination of materials, either wrapped or unwrapped, and also includes tubes which may be empty or filled or partially filled with filtering material and/or tobacco.

The expression "cigarettes" as used herein comprises cigarettes of the usual length or lengths of cigarette rod shorter or longer than the usual cigarettes.

What I claim is:

1. In a method for the production of filter tip cigarettes the steps of feeding a continuous length of tobacco on to a rotating circular member, severing the length into portions said portions comprising substantially all of said tobacco, and moving all the portions radially outwards to form circumferential spaces between them.

2. In a method for the production of filter tip cigarettes the steps of feeding a continuous length of tobacco on to a rotating horizontally disposed circular member, severing the length into portions said portions comprising substantially all of said tobacco and moving all the portions radially outwards to form circumferential spaces between them.

3. In a method for the production of filter tip cigarettes the steps of feeding a continuous length of tobacco on to a rotating vertically disposed circular member, severing the length into portions said portions comprising substantially all of said tobacco, and moving all the portions radially outwards to form circumferential spaces between them.

4. In a method for the production of filter tip cigarettes the steps of feeding a continuous length of tobacco on to a rotating circular member, severing the length into portions, moving the portions radially outwards to form spaces between them and transferring the spaced apart portions from the rotating circular member to a moving web of paper upon which lengths of filter tip material are located at spaced intervals in such a way that each tobacco portion is disposed between two lengths of filter tip material.

5. A method for the production of filter tip cigarettes which comprises feeding a continuous length of tobacco on to a rotating circular member, severing the length into portions, moving the portions radially outwards to form spaces between them, transferring the spaced apart portions from the rotating circular member to a moving web of paper upon which lengths of filter tip material are located at spaced intervals in such a way that each tobacco portion is disposed between two lengths of filter tip material, to form an assemblage of alternate tobacco portions and portions of filter tip material, wrapping and securing the web of paper around the assemblage to form a continuous rod and dividing the said rod into filter tip cigarettes.

6. In a machine for manufacturing filter tip cigarettes the combination of a rotatable circular member, means for supplying a continuous length of tobacco thereto, means for severing the length of tobacco into portions said portions comprising substantially all of said tobacco, and means for moving all the severed portions radially outwards on the circular member to form circumferential spaces between them.

7. In a machine for manufacturing filter tip cigarettes the combination of a rotatable horizontally disposed circular member, means for supplying a continuous length of tobacco thereto, means for severing the length of tobacco into portions and means for moving all the severed portions radially outwards on the circular member to form circumferential spaces between them.

8. In a machine for manufacturing filter tip cigarettes the combination of a rotatable vertically disposed circular member, means for supplying a continuous length of tobacco thereto, means for severing the length of tobacco into portions said portions comprising substantially all of said tobacco and means for moving all the severed portions radially outwards on the circular member to form circumferential spaces between them.

9. In a machine for manufacturing filter tip cigarettes the combination of a rotatable circular member, means for supplying a continuous length of tobacco thereto, means for severing the length of tobacco into portions, means for moving the severed portions radially outwards to form spaces between them and means for transferring the severed portions of tobacco from the rotatable circular member to a moving web of paper having lengths of filter tip material disposed thereon at spaced intervals in such a way that the lengths of filter tip material and the severed portions of tobacco are disposed alternately.

10. In a machine for manufacturing filter tip cigarettes the combination of a rotatable circular member, a hopper to supply a continuous length of tobacco thereto, clamping means for holding the tobacco onto the rotatable circular member, a knife to sever the length of tobacco into portions, means for moving the severed portions radially outwards to form spaces between them, means to release the portions of tobacco from the clamping means at a predetermined point for the purpose of transferring the portions of tobacco to a moving web of paper having lengths of filter tip material disposed thereon at spaced intervals the arrangement being such that after the transfer of the portions of tobacco to the moving web of paper the lengths of filter tip material and the severed portions of tobacco are disposed alternately.

11. In a machine for manufacturing filter tip cigarettes the combination of a rotatable circular member built up of a plurality of radius rods and peripherally grooved carrier members adapted to receive tobacco, one of said carrier members being mounted upon the outer end of each radius rod, means for supplying a continuous length of tobacco to said rotatable circular member, means for severing the length of tobacco into portions and means for moving the radius rods outwards in the plane of the circular member to form circumferential spaces between all the moved severed lengths of tobacco.

12. In a machine for manufacturing filter tip cigarettes the combination of a rotatable circular member built up of a plurality of radius rods and peripherally grooved carrier members adapted to receive tobacco, one of said carrier members being mounted upon the outer end of each radius rod, a hopper for supplying a continuous length of tobacco to said rotatable circular member, a knife for severing the lengths of tobacco into portions and cam means for moving the radius rods outwards in the plane of the circular member to form circumferential spaces between all the moved severed lengths of tobacco.

13. In a machine for manufacturing filter tip cigarettes the combination of a rotatable circular member built up of a plurality of radius rods and peripherally grooved carrier members adapted to receive tobacco, one of said carrier members being mounted upon the outer end of each radius rod, a hopper for supplying a continuous length of tobacco to said rotatable circular member, a knife for severing the length of tobacco into portions and a cam and push rod device for moving the radius rods outwards in the plane of the circular member to form circumferential spaces between all the moved severed lengths of tobacco.

14. In a machine for manufacturing filter tip cigarettes the combination of a rotatable circular member built up of a plurality of radius rods and peripherally grooved carrier members adapted to receive tobacco, one of said carrier members being mounted upon the outer end of each radius rod, a hopper for supplying a continuous length of tobacco to said rotatable circular member, a knife for severing the length of tobacco into portions, a plate having a cam track therein in which the inner ends of the radius rods are constrained to move and guide blocks the arrangement being such that the radius rods move outwards and inwards in the plane of said circular member between the guide blocks to form circumferential spaces between all the severed lengths of tobacco at pre-determined points.

15. In a machine for manufacturing filter tip cigarettes the combination of a rotatable circular member, a hopper to supply a continuous length of tobacco thereto, gripper members for holding the tobacco on to the rotatable circular member, a knife to sever the length of tobacco into portions, means for moving the severed portions radially outwards to form spaces between them, a cam mechanism to release the portions of tobacco from the gripper members at a pre-determined point for the purpose of transferring the portions of tobacco to a moving web of paper having lengths of filter tip material disposed thereon at spaced intervals, the arrangement being such that after the transfer of the portions of tobacco to the moving web of paper the lengths of filter tip material and the severed portions of tobacco are disposed alternately.

16. A machine for manufacturing filter tip cigarettes comprising a vertically disposed rotatable circular member built up of a plurality of radius rods and peripherally grooved carrier members adapted to receive tobacco, one of said carrier members being mounted upon the outer end of each radius rod, a hopper for supplying a continuous length of tobacco to said rotatable circular member, a knife for severing the length of tobacco into portions, releasable clamping means comprising gripper plates for holding the tobacco in the peripheral grooves of the carrier members and a cam mechanism, a plate having a cam track therein in which the inner ends of the radius rods are constrained to move, part of said cam track being of such an outline that the radius rods are caused to move outwards to form spaces between the severed lengths of tobacco and a second cam track, a plurality of rollers, one connected to each of said radius rods, said rollers being constrained to move in said second cam track, said second track being of such outline as to cause the cam mechanism to open the gripper plates and release the portions of tobacco at a pre-determined point for the purpose of transferring the portions of tobacco from the carrier member to a moving web of paper having lengths of filter tip material disposed thereon at spaced intervals, the timing being such that after the transfer of the portions of tobacco to the moving web of paper the lengths of filter tip material and the severed portions of tobacco are disposed alternately to form an assemblage of alternate tobacco portions and portions of filter tip material, a garniture tube for wrapping the web of paper around the assemblage, and a knife for dividing the assemblage into filter tip cigarettes.

17. A machine for manufacturing filter tip cigarettes comprising a horizontally disposed rotatable circular member comprising a plurality of peripherally grooved carrier members adapted to receive tobacco each being provided with an inwardly directed radial projection and a plurality of guide blocks between which said carrier members are free to slide, means for supplying a continuous length of tobacco to said rotatable circular member, a knife for severing the length of tobacco into portions, a movable closure member for holding the tobacco in the peripheral grooves of the carrier members, a plate having a cam track therein in which the inner ends of the inwardly directed radial projections are constrained to move, part of said cam track being of such outline that the carrier members are caused to move outwards to form spaces between the severed lengths of tobacco and another part of said cam track being of such outline as to cause the carrier members to retract, a cam mechanism to open the closure member and release the portions of tobacco at a predetermined point for the purpose of transferring the portions of tobacco from the carrier member to a moving web of paper having lengths of filter tip material disposed thereon at spaced intervals, the timing being such that after the transfer of the portions of tobacco to the moving web of paper the lengths of filter tip material and the severed portions of tobacco are disposed alternately to form an assemblage of alternate tobacco portions and portions of filter tip material, a garniture tube for wrapping the web of paper around the assemblage, and a knife for dividing the assemblage into filter tip cigarettes.

WILLIAM FREDERICK
      MAITLAND EDWARDS.